(12) United States Patent
Laguteta et al.

(10) Patent No.: US 12,143,685 B2
(45) Date of Patent: Nov. 12, 2024

(54) HTTP BASED MEDIA STREAMING SERVICE LEVERAGING ON FRAGMENTED MP4

(71) Applicant: HITACHI VANTARA LLC, Santa Clara, CA (US)

(72) Inventors: Giuseppe Laguteta, San Jose, CA (US); Marco Bernasconi, Senago (IT); Frances Yip, Santa Clara, CA (US); Mengjie Wang, Milpitas, CA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 0 days.

(21) Appl. No.: 18/023,663

(22) PCT Filed: Sep. 8, 2020

(86) PCT No.: PCT/US2020/049716
§ 371 (c)(1),
(2) Date: Feb. 27, 2023

(87) PCT Pub. No.: WO2022/055476
PCT Pub. Date: Mar. 17, 2022

(65) Prior Publication Data
US 2023/0283859 A1 Sep. 7, 2023

(51) Int. Cl.
*H04N 21/647* (2011.01)
*H04N 21/643* (2011.01)
(52) U.S. Cl.
CPC ..... *H04N 21/64715* (2013.01); *H04N 21/643* (2013.01)

(58) Field of Classification Search
CPC .............. H04N 21/64715; H04N 21/643
See application file for complete search history.

(56) References Cited

U.S. PATENT DOCUMENTS

| 2017/0093939 A1 | 3/2017 | Bar-Mashiah et al. |
| 2017/0195386 A1 | 7/2017 | Nathan et al. |

(Continued)

FOREIGN PATENT DOCUMENTS

| JP | 2020524338 A | 8/2020 |
| WO | 2018234080 A1 | 12/2018 |

OTHER PUBLICATIONS

International Search Report and Written Opinion for PCT/US2020/049716, mailed on Dec. 21, 2020, in 9 pages.

(Continued)

*Primary Examiner* — Mulugeta Mengesha
(74) *Attorney, Agent, or Firm* — Procopio, Cory, Hargreaves & Savitch LLP (57) ABSTRACT

Systems and methods described herein involve establishing a secure hypertext transfer protocol (HTTPS) connection between a media server and one or more cameras selected by a client device through a web browser application; establishing a websocket secure (WSS) connection between the media server and the web browser application of the client device; receiving, at the media server, media chunks of live video from the selected one or more cameras through the HTTPS connection; and transmitting, from the media server, the media chunks of live video received from the selected one or more cameras to the web browser application of the client device through the WSS connection.

11 Claims, 9 Drawing Sheets

(56) References Cited

U.S. PATENT DOCUMENTS

2019/0253742 A1    8/2019  Garten et al.
2020/0029086 A1*  1/2020  Zou .................... H04N 19/436
2020/0160679 A9*  5/2020  Dawes .................. H04L 67/02

OTHER PUBLICATIONS

Japanese Office Action dated Jan. 9, 2024, in counterpart Japanese Application No. 2023-506002.
Extended European Search Report, dated Feb. 9, 2024, in counterpart European Application No. 20953467.6.

* cited by examiner

HTTP BASED MEDIA STREAMING SERVICE LEVERAGING ON FRAGMENTED MP4

BACKGROUND

Field

The present disclosure is directed to media streaming systems, and more specifically, to addressing latency and jitter in media streaming systems involving live video feeds.

Related Art

Related art solutions for media streaming are usually oriented to Video on Demand (VoD), Subscription Video on Demand (SVoD) and general Over-the-Top (OTT) services. Over the past years, Closed-Circuit Television (CCTV) companies developed streaming servers using proprietary or semi-standard protocols, mainly based on Real Time Streaming Protocol (RTSP) and Real Time Messaging Protocol (RTMP), therefore having limited compatibility with web-based interfaces. Other vendors, oriented to entertainment, invested on broadcasting TV businesses, focusing mainly on SVoD while compromising on live streaming services as live streaming services are not critical for their market.

Live streaming over Hyper Text Transfer Protocol (HTTP) was utilized in the related art an alternative to fulfill the need of streaming to web clients but often involved compromises in terms of performance. For this reason, related art implementations have focused on RTMP based implementations for web live streaming. However, RTMP was not developed with the security measures in mind that web browsers and applications have adopted.

In related art implementations, recent developments utilizing HTTP as protocol to stream live video have incorporated the common media application format (CMAF) as a common standard for web-based ecosystems. CMAF extends existing fragmented Moving Picture Experts Group-4 (MP4) best practices to ensure a wider and unified compatibility with existing Dynamic Adaptive Streaming over HTTP (DASH) and HTTP Live Streaming (HLS) streaming approaches.

SUMMARY

The example implementations described herein involve live streaming such as CCTV streaming and optimizes the video pipeline for specific scenarios in security. In example implementations described herein, there are systems and methods for a media streaming service optimized for CCTV systems which facilitates users to consume live feeds with low latency performances.

In example implementations described herein, the problem of streaming in high performance live and archived video to standard web clients are addressed to overcome the typical latency and jitter problems encountered by the related art streaming pipelines. Example implementations described herein are directed to replacement of related art technologies using RTMP with a secure and scalable solution based on streaming over HTTP.

Example implementations involve a DASH compliant high-performance Media Streaming Service able to broadcast security camera feeds to standard web clients. Example implementations involve an apparatus such as a media server that manages incoming fragmented MP4 files in DASH format and broadcasts media feeds to HTML5 standard web players. Through the use of a lightweight and optimized footprint, such a media server can stream over HTTP with very low latency, ensuring low latency performance for live streaming.

Related art implementations based on Flash (RTMP) are weak in terms of security and compatibility with the latest web browser standards. Further, related art media services on the market poorly scale when it comes to HTTP based streaming, often affecting the video latency. To address such issues in the related art, example implementations manage and route incoming video feeds and broadcast them without introducing any line of delay. Such example implementations can also be used to facilitate VoD support.

Example implementations further involve the use of fragmented MP4 audio/video over HTTP and WebSocket/Web-Socket Secure (WS/WSS), ensuring a performant and persistent communication layer between web clients and server. Since common protocols such as HTTP and WSS are utilized, the example implementations described herein can thereby secure and scale through the use of layer 7 reverse proxies and load balancers. In addition, since intelligent routing of the incoming feeds to web clients is provided, latency can be reduced to very low levels (e.g., to 1 s), even in presence of complex network topologies.

Aspects of the present disclosure can involve a method, which can involve establishing a secure hypertext transfer protocol (HTTPS) connection between a media server and one or more cameras selected by a client device through a web browser application; establishing a websocket secure (WSS) connection between the media server and the web browser application of the client device; receiving, at the media server, media chunks of live video from the selected one or more cameras through the HTTPS connection; and transmitting, from the media server, the media chunks of live video received from the selected one or more cameras to the web browser application of the client device through the WSS connection.

Aspects of the present disclosure can involve a non-transitory computer readable medium, storing instructions for executing a process, the instructions involving establishing a secure hypertext transfer protocol (HTTPS) connection between a media server and one or more cameras selected by a client device through a web browser application; establishing a websocket secure (WSS) connection between the media server and the web browser application of the client device; receiving, at the media server, media chunks of live video from the selected one or more cameras through the HTTPS connection; and transmitting, from the media server, the media chunks of live video received from the selected one or more cameras to the web browser application of the client device through the WSS connection.

Aspects of the present disclosure can involve a system, which can involve means for establishing a secure hypertext transfer protocol (HTTPS) connection between a media server and one or more cameras selected by a client device through a web browser application; means for establishing a websocket secure (WSS) connection between the media server and the web browser application of the client device; means for receiving, at the media server, media chunks of live video from the selected one or more cameras through the HTTPS connection; and means for transmitting, from the media server, the media chunks of live video received from the selected one or more cameras to the web browser application of the client device through the WSS connection.

Aspects of the present disclosure further involve an apparatus, which can involve a processor, configured to establish a secure hypertext transfer protocol (HTTPS) connection between a media server and one or more cameras selected by a client device through a web browser application; establish a websocket secure (WSS) connection between the media server and the web browser application of the client device; receive, at the media server, media chunks of live video from the selected one or more cameras through the HTTPS connection; and transmit, from the media server, the media chunks of live video received from the selected one or more cameras to the web browser application of the client device through the WSS connection.

DETAILED DESCRIPTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein involve apparatuses such as media streaming servers designed and optimized for CCTV security systems. Such media servers are configured to receive security camera video feeds and broadcast them to web clients in a secure and performant way.

Figure 1:
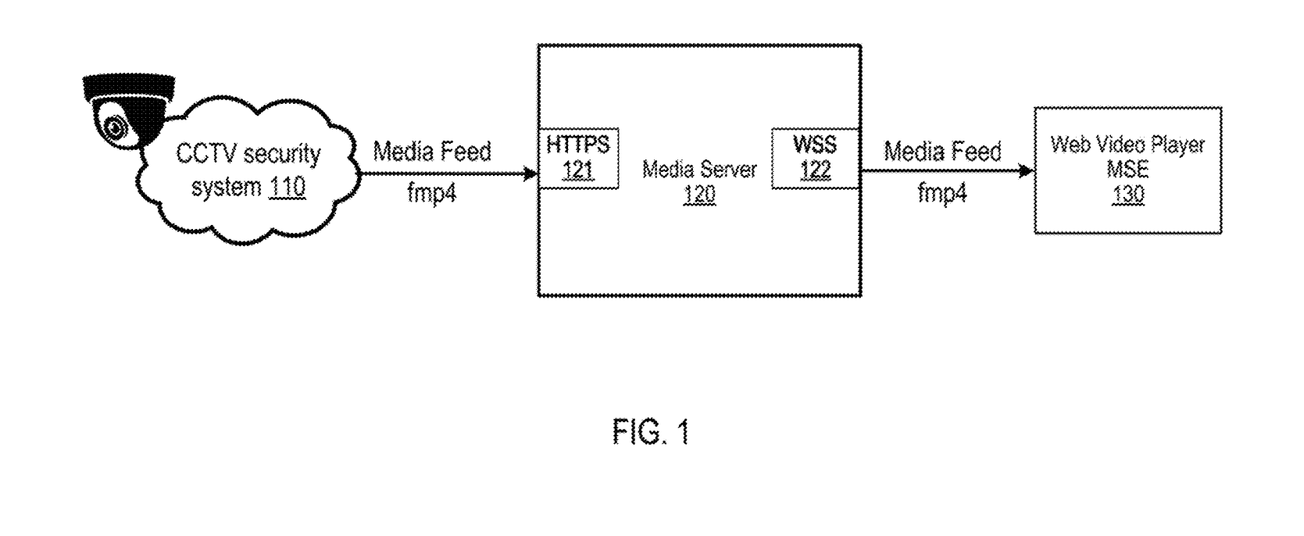
FIG. 1 illustrates an example video pipeline, in accordance with an example implementation.

FIG. 1 illustrates an example video pipeline, in accordance with an example implementation. Specifically, FIG. 1 represents the video pipeline, end-to-end from a generic CCTV device, Camera, Video Recorder (NVR) or Video management Server (VMS) to the end consumer hosted in a web application, such as a standard HTML5 Video Player. In the example of FIG. 1, the architecture involves a CCTV security system 110 which can involve a plurality of CCTV devices or cameras, an apparatus such as a media server 120, and an end user web based media player implementing MSE 130. The CCTV security system 110 streams media chunks to media server 120 through the use of an HTTPS connection 121, and the media server 120 streams the media chunks to the web based media player 130 through a WSS connection 122.

In the example of FIG. 1, the pipeline involves splitting the video in self-contained media chunks (e.g., fragmented MP4) that can be managed by any browser implementing standard Media Source Extensions (MSE). Formats such as DASH can be utilized because of the strong compatibility with HTTP based streaming, especially for live streaming. By using this approach, the pipeline optimizes the usage of browser codecs and ensures low latency performances even with many video players loaded on the same web page, consuming different live or on-demand feeds. Another important characteristic of the communication layer is having a persistent socket between the web video player and the media server. Such example implementations allow the system to stream while reducing latency and jitter without introducing protocol overhead. The browser will receive a continuous stream of video chunks feeding the MSE and allow the browser to decode the video through using native codecs.

In example implementations, the media chunks utilized are in the form of fragmented MP4 due to its configurability to facilitate the chunks at lower time frames (e.g., in the form of 500 ms chunks or less) which can ensure that the latency remains low, and due to web based media players having the MP4 codec available as default. Further, CCTV cameras can readily provide fragmented MP4s natively through a library such as FFMPEG, so that media chunks received from the camera can be consistently forwarded to the web based media player 130 through the media server 120 without any change for immediate playback. In addition, fragmented MP4s are container files and can contain any type of media (e.g., audio, video) as divided into the fragment (e.g., 500 ms chunks or less) to facilitate flexible transmission and immediate playback at any browser/web based media player. However, other types of configurable types of media chunks may also be utilized in accordance with the desired implementation.

Figure 3:
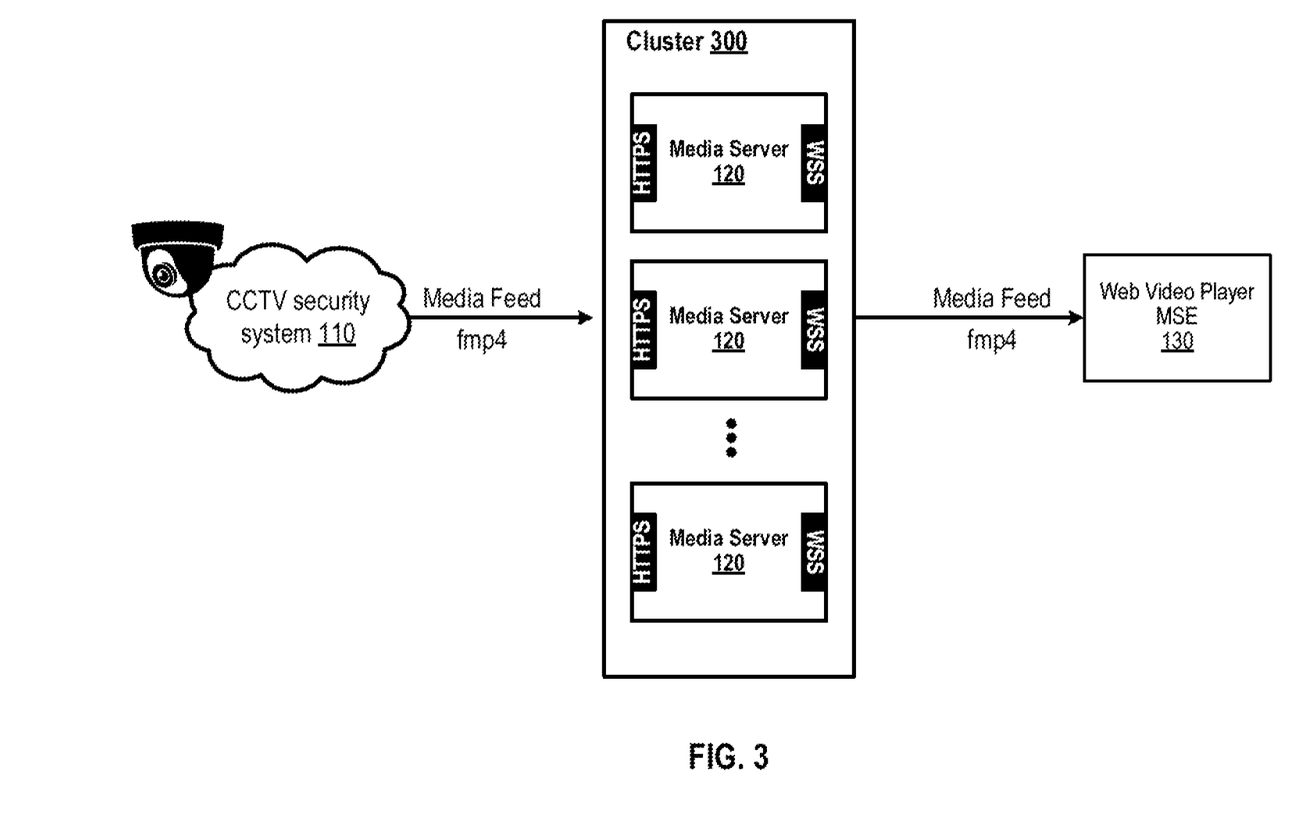
FIG. 3 illustrates an example cluster architecture to scale up or down media servers, in accordance with an example implementation.

As the media server 120 is configured to establish the connections and forward the media chunks between the CCTV system 110 and the web based media player 130 through HTTPS 121 and WSS 122, the hardware requirements for media server 120 can be minimized and can be implemented flexibly for scaling up or down within a cloud provisioning data center as illustrated in FIG. 3. Connections established through HTTPS 121 and WSS 122 are secure connections which ensures the security of the transmission of media chunks while being flexible for scalability and for facilitating reverse proxies. Media server 120 can also be replaced with other types of apparatuses in accordance with the desired implementation (e.g., personal computer, laptop, gateway router) due to the minimization of hardware required through the architecture described herein. In an example implementation, media server 120 can thereby be configured to only cache media chunks until the chunk is completed, from which the media server 120 immediately forwards the completed chunk to the web based media player 130 to ensure low latency.

Through this architecture, it is possible to facilitate near real time latency (e.g., 1 s) from CCTV surveillance systems to the web based media player while maintaining security of the video feeds through the HTTPS and WSS connections. As most use cases for CCTV surveillance systems tend to require real time feed (e.g., security systems, police surveillance, etc.), the architecture described herein is an improvement to related art implementations that do not achieve such low latency and are thereby not applicable for CCTV surveillance systems. Related art systems are typically 10-15 s of latency and are not suitable for CCTV surveillance systems, and also cannot handle multiple live stream camera feeds being provided to a particular client device with the required latency.

In the example architecture illustrated in FIG. 1, a WSS connection is maintained between the media server 120 and the web based media player 130 so that a low latency persistent channel can be maintained between them, and to reduce the overhead in the connection to facilitate low latency in comparison to an HTTPS connection. Should the WSS connection fail, then the media server 120 will thereby be made aware of the failure through the notifications received through the WSS protocol and can recover the connection must more quickly and efficiently in comparison to an HTTPS connection.

Figure 2:
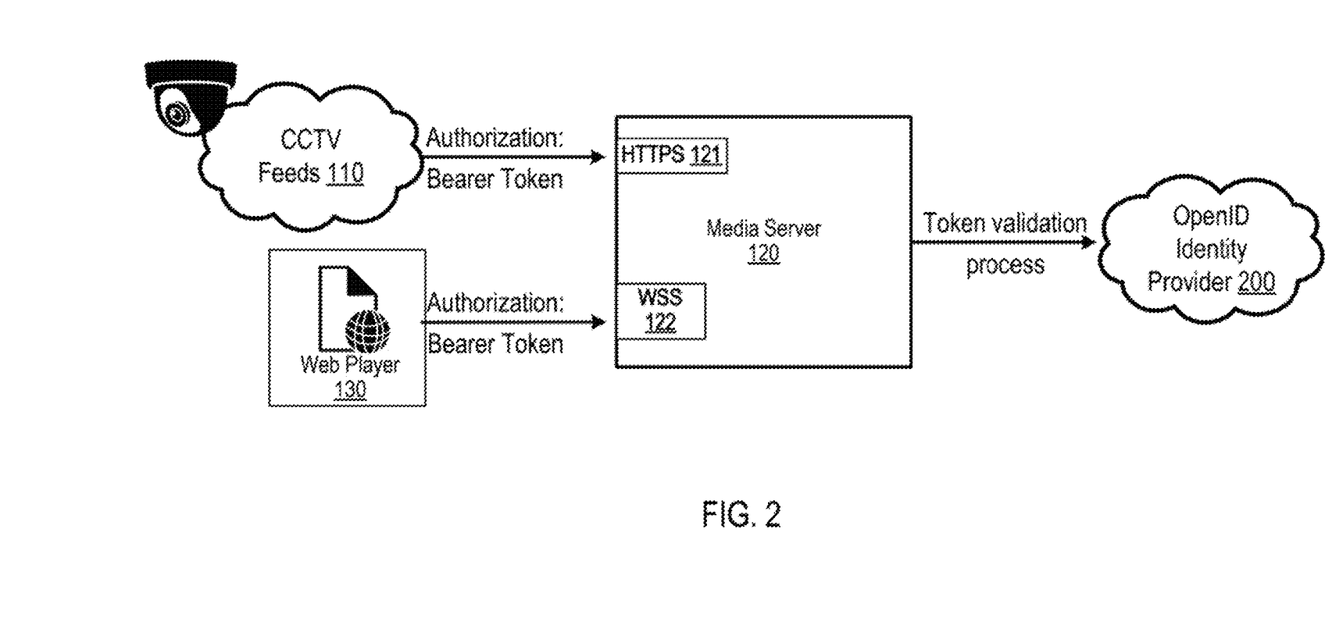
FIG. 2 illustrates an example security pipeline, in accordance with an example implementation.

FIG. 2 illustrates an example security pipeline, in accordance with an example implementation. Example implementations described herein are OpenID compliant, so that it can integrate with any OpenID identity manager, and thereby allow feeds to be secured with a standard mechanism. When the media server 120 receives a request to push or consume a video, a token validation is performed, which involves a set of methods that validate a bearer token received in the media feed authorization header of every media feed, for both incoming and outgoing requests. Based on the incoming token validation, the requests will be processed or not. In the example implementation of FIG. 2, the media server decouples processing of the token to a common user management as delegated to an identity provider 200, which allows the resources of the media server 120 to be dedicated to forwarding media chunks to the client with lower latency while maintaining flexibility. Depending on the desired implementation, a built-in memory cache can also re-use authorization information to validate already processed tokens without a new iteration with the Identity Provider 200.

As illustrated in FIG. 2, the example implementations expose secured channels through HTTPS 121 and WSS 122, both compatible with transport layer security (TLS) 1.2. Through such implementations, clients and server are thereby forced to communicate only through encrypted channels, reducing the risk of exposing unwanted contents. The authentication method based on OpenID is just one of the possible mechanisms that can be utilized based on the flexible plug-in based architecture described herein; other authentication methods may also be deployed in accordance with the desired implementation.

In example implementations, web application programming interfaces (APIs) such as RESTful API can be utilized to monitor the status of the feeds. In particular, such implementations can provide a snapshot of the current incoming feeds along with the count of consuming clients, stream status and timestamps of last interactions, grouped by instances of media servers 120.

Web based media player 130 can be implemented in the form of a high performance HTML5 Web Video Player designed specifically for CCTV live stream through the media server 120. In example implementations described herein, the web based video player 130 is configured to support API key/token definition for authentication and authorization, live edge strategy to ensure latency as low as a fraction of a second, a retry mechanism when the video feed is not immediately available, internal events exposure, log and statistics functions, as well as multi track management.

To facilitate VoD implementations, the media server 120 manages DASH streams and enclosed media files as well as any format that browsers can handle. VoD is performed by implementing pseudo-streaming. The web based media player 130, and any HTML5 standard Player is configured to consume video files provided by the media server 120 as the media server 120 is configured to support Hypertext Markup Language (HTML) 1.1+ specifications.

FIG. 3 illustrates an example cluster architecture to scale up or down media servers, in accordance with an example implementation. In example implementations, media server 120 is configured to be lightweight, multi-platform, secure, scalable and performant. The internal architecture makes use of plug-ins and middlewares to ensure expandability without compromising in performance. The video pipeline performs with a latency as low as 1 second, something that related art implementations cannot reach without relying on expensive and big infrastructures, usually hosted on the cloud. Example implementations can reduce the latency 5-10 times of the latency compared to related art implementations. Further, one single instance of media server 120 can be configured to manage up to 100 concurrent full frame HD video feeds. In example implementations, scaling the media server is pretty straightforward and involves adding a new node to the cluster 200 depending on the need.

In the example of FIG. 3, any load balancing process known in the art can be utilized to balance the media servers utilized and/or the number of feeds being provided to each media server. For example, a media server may be configured to facilitate a threshold of feeds simultaneously (e.g., 100). If the threshold is to be exceeded, then the backend management server (e.g., illustrated in FIG. 4), may scale up the system by allocating additional media servers to load balance the feeds. Further, such a backend management server can scale down the number of media servers utilized should the user then reduce the number of feeds to be viewed.

Figure 4:
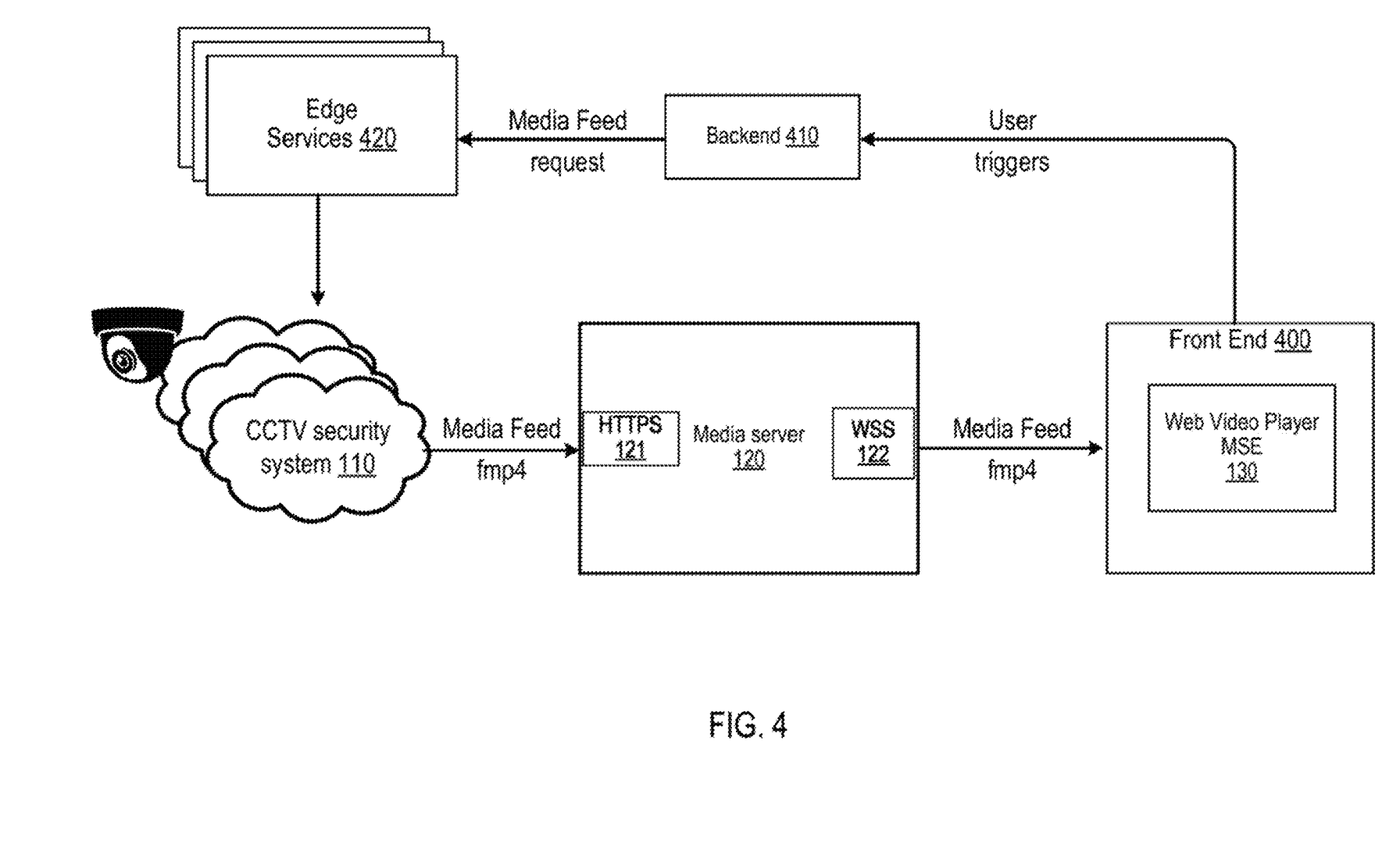
FIG. 4 illustrates an example architecture upon which example implementations can be implemented.

FIG. 4 illustrates an example architecture upon which example implementations can be implemented. As illustrated in FIG. 4, the web based media player 130 is executed on a frontend client device 400. When the client device 400 provides a selection of one or more cameras for viewing (e.g., through a graphical user interface), a trigger is sent to a backend management server 410 which processes the request to determine if the cameras are available. If so, then the management server 410 provides a media feed request to edge devices 420 managing the corresponding cameras. Edge devices 420 then control the corresponding cameras in the CCTV system 110 to connect to the media server 120 to provide fragmented media chunks of the live streaming video. The fragmented media chunks are provided to the client device 400 to process in the web based media player 130. The flow of the architecture in FIG. 4 is described in more detail in FIGS. 6(a) to 6(c).

The example implementations described herein can be used in many different scenarios and it is open to all potential future uses that require a real live streaming service with extreme low latencies and high performances. In an example implementation, the system can be fully integrated in a large situation awareness system enabling live video streaming from thousands of security cameras from disparate CCTV sub-systems. Due to the architecture, the example implementations can be integrated very smoothly in a web based application that consumes media feeds from the edge.

Figure 5:
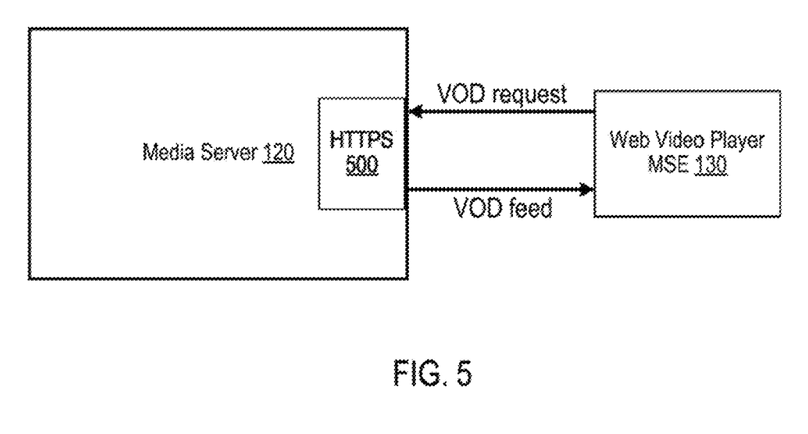
FIG. 5 illustrates an example implementation of VoD support, in accordance with an example implementation.

FIG. 5 illustrates an example implementation of VoD support, in accordance with an example implementation.

The VoD support opens the opportunity to use the media server 120 as a Video-On-Demand platform. In such an example implementation, a client device can request that a video be stored at one of the media servers 120 through the architecture illustrated in FIG. 4. Once the video is stored on the media server 120, then an HTTPS connection 500 can be established between the web based media player 130 and the corresponding media server 120, from which a VoD request can be submitted and VoD feed can be provided.

Due to its plug-in based architecture, example implementations can integrate with any kind of external system for feed provisioning for video analytics, deep learning engines, and so on, custom workflows, media asset management, and live events broadcasting.

Figure 6A:
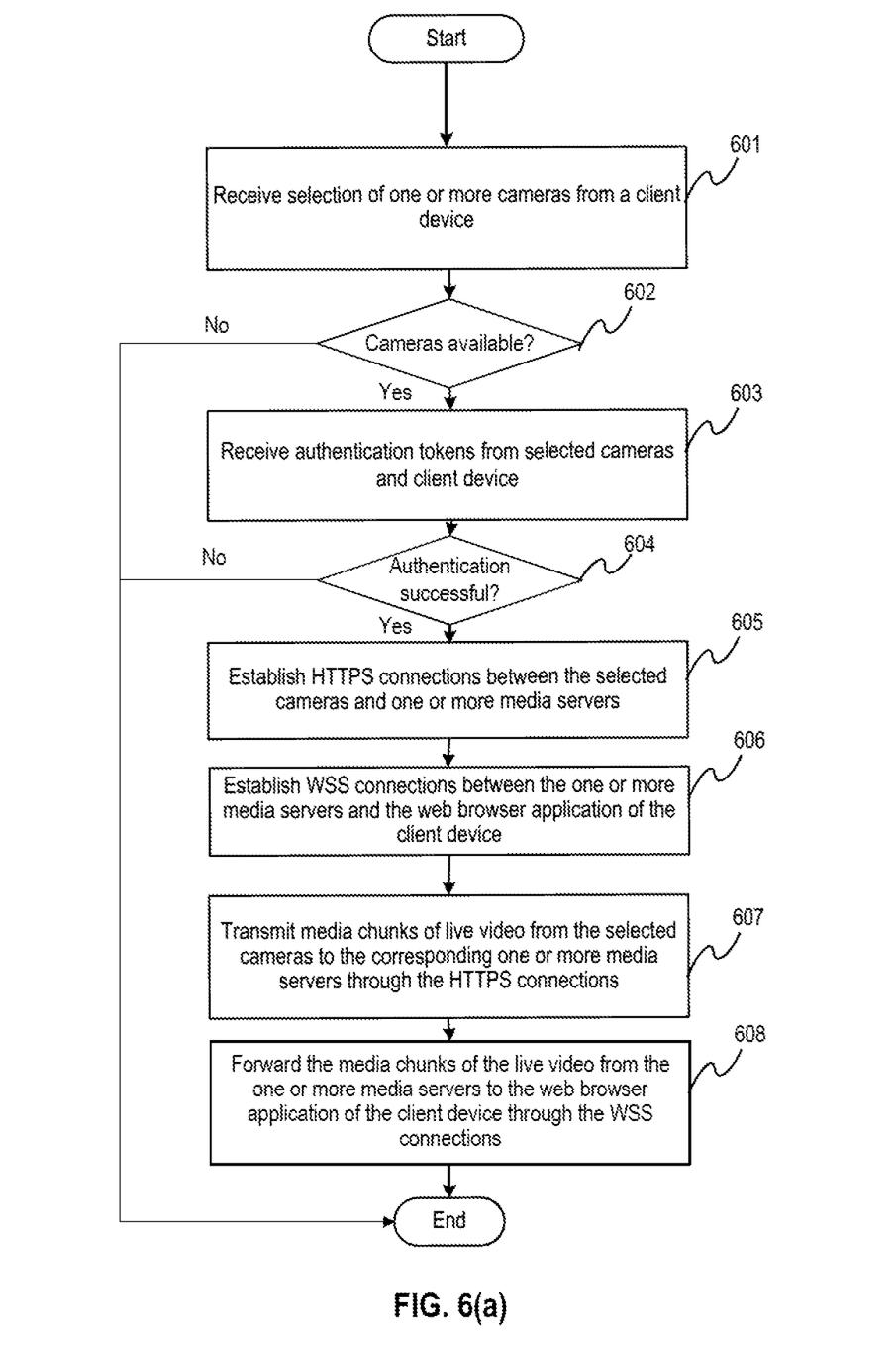
FIGS. 6(a) to 6(c) illustrate example flow diagrams upon which example implementations may be utilized.
Figure 6B:
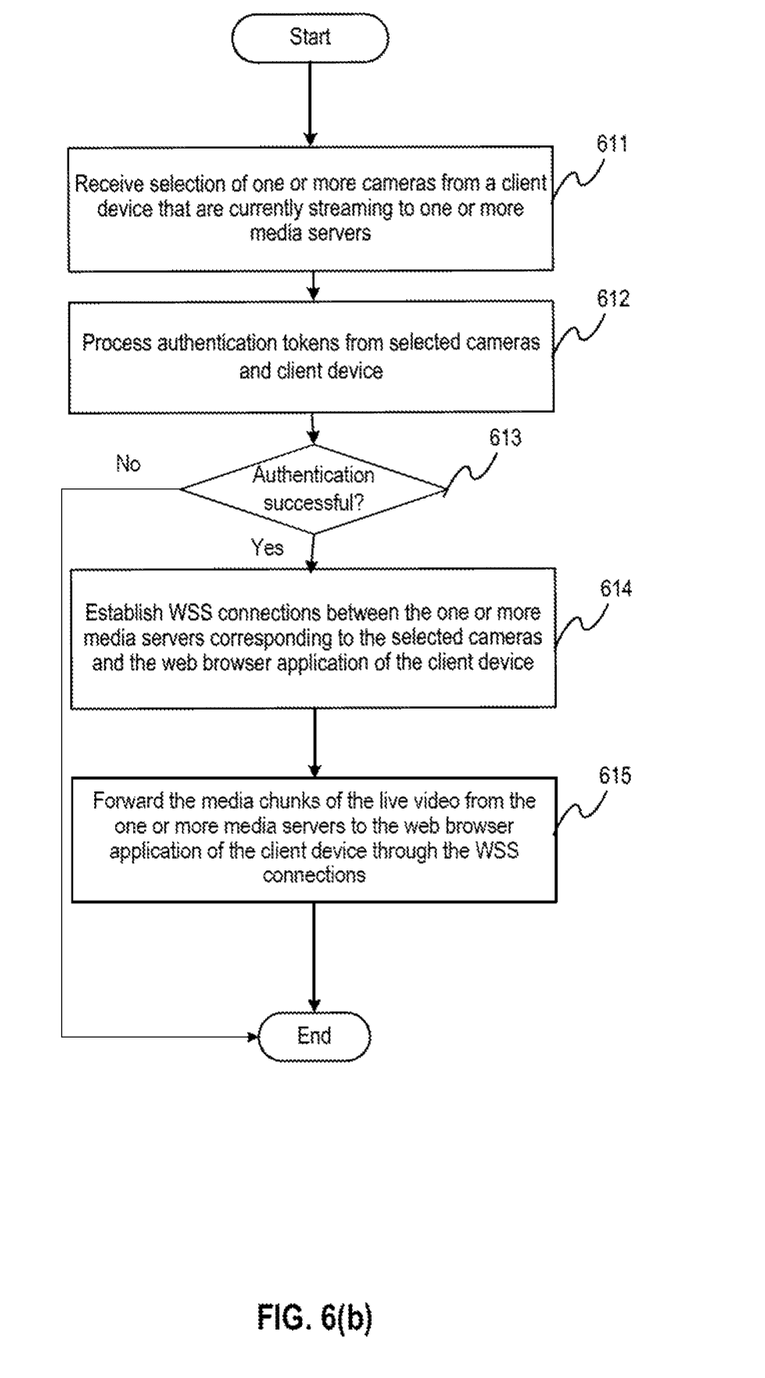
Figure 6C:
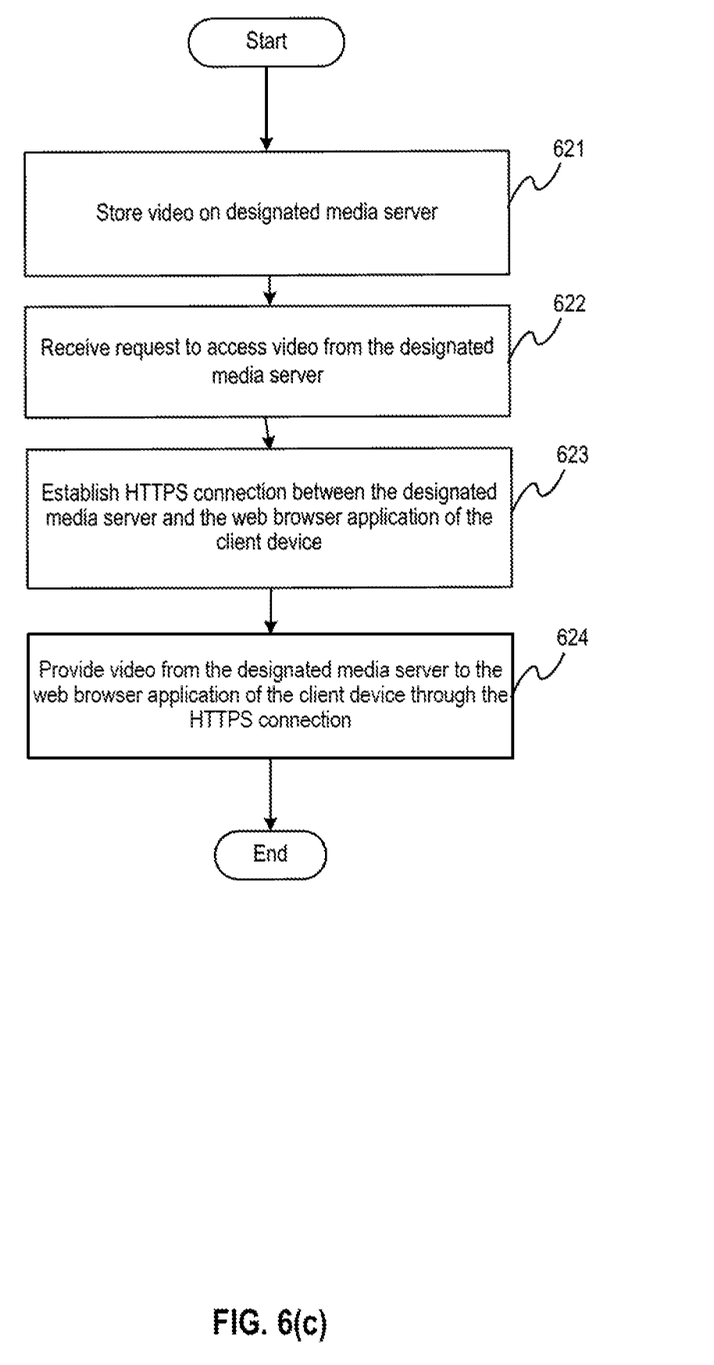

FIGS. 6(a) to 6(c) illustrate example flow diagrams, in accordance with an example implementation. Specifically, the flow of FIG. 6(a) illustrates an example of the flow to select cameras and establish the connections between media server, CCTV system and web based media player as illustrated in FIG. 1 and FIG. 4, and can be facilitated either by a backend management server, the media server, or a combination of both.

At first, a selection of one or more cameras is received from a client device at 601. At 602, a determination is made as to whether the cameras are available 602. Such a determination can be made based on whether the camera is available to provide live video feed at the time of the request or not. If so (Yes), then the flow then the flow proceeds to 603 to receive the authentication tokens from selected cameras and from the client device as illustrated in FIG. 2.

At 604, a determination is made as to whether the authentication is successful as determined in FIG. 2. If so (Yes), then the flow proceeds to 605 to establish HTTPS connections between the selected cameras and one or more media servers, and to establish WSS connections between the one or more media servers and the web browser application of the client device at 606. The HTTPS connections and WSS connections can be established through standard handshaking protocols as would be known to one of ordinary skill in the art.

At 607, the media chunks of live video are transmitted from the selected cameras to the corresponding one or more media servers through the HTTPS connections. At 608, the media chunks of the live video are forwarded from the one or more media servers to the web browser application of the client device through the WSS connections.

FIG. 6(b) illustrates a flow diagram for using a media server that is already broadcasting requested media chunks of selected cameras to connect to other client devices that are also requesting the same selected cameras. In example implementations described herein, a media server forwarding media chunks through WSS connections thereby already has such media chunks available, and can forward the media chunks to other devices that request such media chunks through WSS connections. In this manner, a user can spawn multiple instances of the same camera feed across different devices if desired. The flow can be facilitated either by a backend management server, the media server, or a combination of both.

At 611, the flow receives a selection of one or more cameras from a client device that are currently streaming to one or more media servers. At 612, the flow processes authentication tokens from selected cameras and client device as described in FIG. 2. In example implementations, the media server may already have the token from the cameras available in the cache, which can be used to compare with any received tokens from other client devices.

At 613, a determination is made as to whether the authentication was successful. If so (Yes), then the flow proceeds to 614 to establish WSS connections between the one or more media servers corresponding to the selected cameras and the web browser application of the client device and forward the media chunks of the live video from the one or more media servers to the web browser application of the client device through the WSS connections at 615.

FIG. 6(c) illustrates an example flow for providing video to a media server for later request over VoD, in accordance with an example implementation, and as illustrated in FIG. 5. The flow can be facilitated either by a backend management server, the media server, or a combination of both. At first, requested video is stored on designated media server at 621. At 622, the flow receives a request to access video from the designated media server. At 623, the flow establishes HTTPS connection between the designated media server and the web browser application of the client device as illustrated in FIG. 5. At 624, the flow provides video from the designated media server to the web browser application of the client device through the HTTPS connection.

Figure 7:
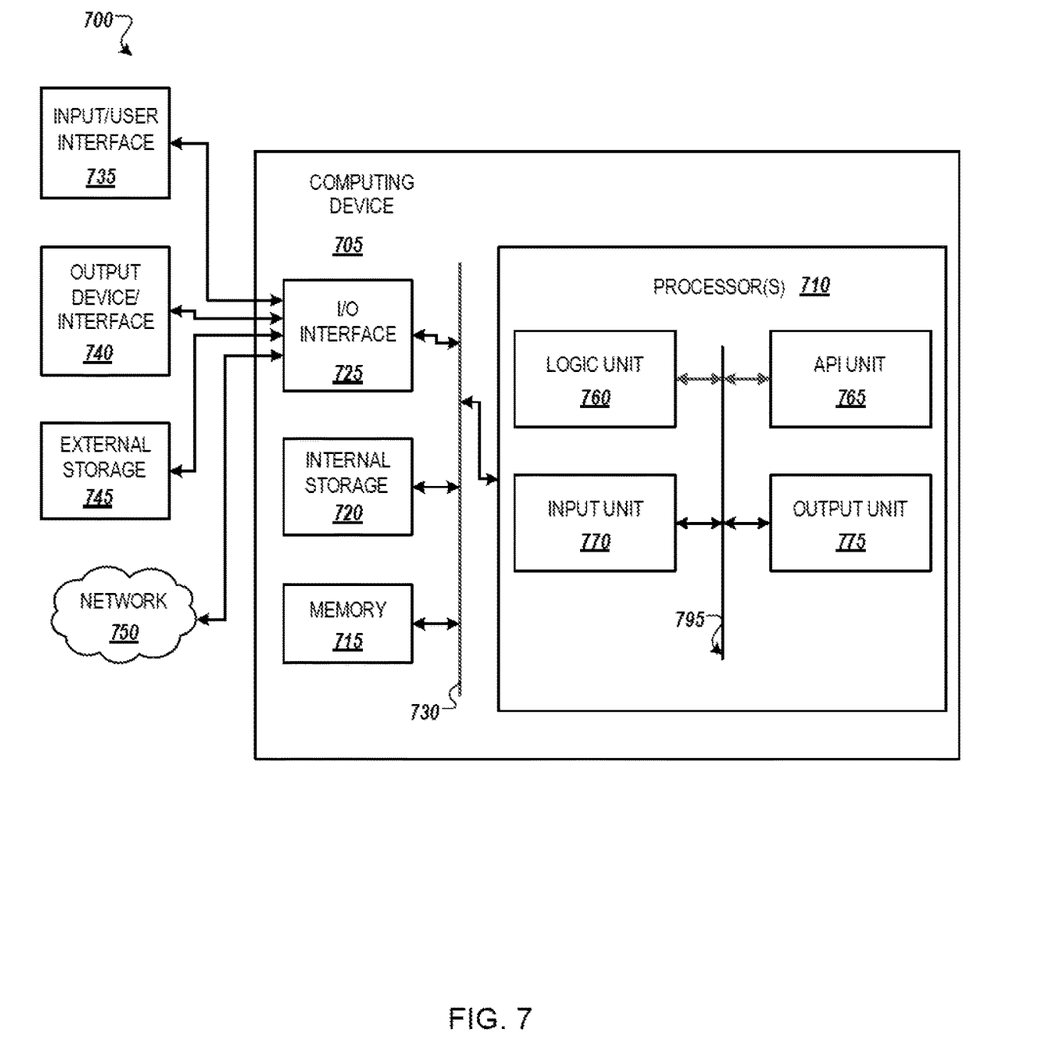
FIG. 7 illustrates an example computing environment with an example computer device suitable for use in some example implementations.

FIG. 7 illustrates an example computing environment with an example computer device suitable for use in some example implementations, such as a backend server or a media server as illustrated in FIGS. 1 and 4. Computer device 705 in computing environment 700 can include one or more processing units, cores, or processors 710, memory 715 (e.g., RAM, ROM, and/or the like), internal storage 720 (e.g., magnetic, optical, solid state storage, and/or organic), and/or IO interface 725, any of which can be coupled on a communication mechanism or bus 730 for communicating information or embedded in the computer device 705. IO interface 725 is also configured to receive images from cameras or provide images to projectors or displays, depending on the desired implementation.

Computer device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computer device 705. In other example implementations, other computer devices may function as or provide the functions of input/user interface 735 and output device/interface 740 for a computer device 705.

Examples of computer device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 705 can be communicatively coupled (e.g., via IO interface 725) to external storage 745 and network 750 for communicating with any number of networked components, devices, and systems, including one or more computer devices of the same or different configuration. Computer device 705 or any connected computer device can be functioning as, providing services of, or referred to as a server, client, thin server, general machine, special-purpose machine, or another label.

IO interface 725 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computer device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, and inter-unit communication mechanism 795 for the different units to communicate with each other, with the OS, and with other applications (not shown). The described units and elements can be varied in design, function, configuration, or implementation and are not limited to the descriptions provided. Processor(s) 710 can be in the form of hardware processors such as central processing units (CPUs) or in a combination of hardware and software units.

In some example implementations, when information or an execution instruction is received by API unit 765, it may be communicated to one or more other units (e.g., logic unit 760, input unit 770, output unit 775). In some instances, logic unit 760 may be configured to control the information flow among the units and direct the services provided by API unit 765, input unit 770, output unit 775, in some example implementations described above. For example, the flow of one or more processes or implementations may be controlled by logic unit 760 alone or in conjunction with API unit 765. The input unit 770 may be configured to obtain input for the calculations described in the example implementations, and the output unit 775 may be configured to provide output based on the calculations described in example implementations.

Memory 615 can be configured to store instructions for facilitating the flow diagrams of FIGS. 6(*a*) to 6(*c*) to be loaded into processor(s) 710.

As illustrated in FIG. 1 and FIG. 6(*a*), processor(s) 710 can be configured to establish a secure hypertext transfer protocol (HTTPS) connection between a media server and one or more cameras selected by a client device through a web browser application; establishing a websocket secure (WSS) connection between the media server and the web browser application of the client device; receive, at the media server, media chunks of live video from the selected one or more cameras through the HTTPS connection; and transmit, from the media server, the media chunks of live video received from the selected one or more cameras to the web browser application of the client device through the WSS connection. As illustrated in FIG. 1, the media chunks can be in fragmented MP4 format.

As illustrated in FIG. 2 and FIGS. 6(*a*) and 6(*b*), processor (s) 710 can be configured to conduct authorization for the web browser application of the client device to access the live video from the selected one or more cameras based on validation of authentication tokens received from the web browser of the client device and from the selected one or more cameras.

As illustrated in FIG. 3, processor(s) 710 can be configured to, for a number of the one or more cameras selected by the client device through the web browser application exceeding a threshold, execute a load balancing process involving establishing another secure hypertext transfer protocol (HTTPS) connection between another media server and a subset of the one or more cameras selected by a client device through the web browser application; establishing another websocket secure (WSS) connection between the media server and the web browser application of the client device; receiving, at the another media server, second media chunks of second live video from the subset of the one or more cameras through the another HTTPS connection; and transmitting, from the another media server, the second media chunks of the second live video to the web browser application of the client device through the another WSS connection as illustrated in FIG. 3.

As illustrated in FIG. 4, processor(s) 710 can be configured to receive the selection of the one or more cameras from the client device through the web browser application; and instruct edge devices to activate the live video for the selected one or more cameras.

As illustrated in FIG. 5 and FIG. 6(*c*), processor(s) 710 can be configured to establish another HTTPS connection between the web browser application of the client device and the media server; and transmit video stored on the media server to the web browser application of the client device through the another HTTPS connection.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   for performing live streaming:
   establishing a first secure hypertext transfer protocol (HTTPS) connection between a media server and one or more cameras selected by a client device through a web browser application;
   establishing a websocket secure (WSS) connection between the media server and the web browser application of the client device;
   receiving, at the media server, media chunks of live video from the selected one or more cameras through the first HTTPS connection; and
   transmitting, from the media server, the media chunks of live video received from the selected one or more cameras to the web browser application of the client device through the WSS connection; and
   for performing video on demand of a video stored on the media server:
   establishing a second HTTPS connection between the web browser application of the client device and the media server; and
   transmitting the video to the web browser application of the client device through the second HTTPS connection.

2. The method of claim 1, wherein the media chunks are in fragmented MP4 format.

3. The method of claim 1, further comprising conducting authorization for the web browser application of the client device to access the live video from the selected one or more cameras based on validation of authentication tokens received from the web browser of the client device and from the selected one or more cameras.

4. The method of claim 1, further comprising, for a number of the one or more cameras selected by the client device through the web browser application exceeding a threshold, executing a load balancing process comprising:
   establishing a third secure hypertext transfer protocol (HTTPS) connection between another media server and a subset of the one or more cameras selected by a client device through the web browser application;
   establishing another websocket secure (WSS) connection between the media server and the web browser application of the client device;
   receiving, at the another media server, second media chunks of second live video from the subset of the one or more cameras through the third HTTPS connection; and
   transmitting, from the another media server, the second media chunks of the second live video to the web browser application of the client device through the another WSS connection.

5. The method of claim 1, further comprising:
   receiving the selection of the one or more cameras from the client device through the web browser application; and
   instructing edge devices to activate the live video for the selected one or more cameras.

6. A non-transitory computer readable medium, storing instructions for executing a process, the instructions comprising:
   for performing live streaming:
   establishing a first secure hypertext transfer protocol (HTTPS) connection between a media server and one or more cameras selected by a client device through a web browser application;
   establishing a websocket secure (WSS) connection between the media server and the web browser application of the client device;
   receiving, at the media server, media chunks of live video from the selected one or more cameras through the first HTTPS connection; and
   transmitting, from the media server, the media chunks of live video received from the selected one or more cameras to the web browser application of the client device through the WSS connection; and for performing video on demand of a video stored on the media server:
   establishing a second HTTPS connection between the web browser application of the client device and the media server; and
   transmitting the video to the web browser application of the client device through the second HTTPS connection.

7. The non-transitory computer readable medium of claim 6, wherein the media chunks are in fragmented MP4 format.

8. The non-transitory computer readable medium of claim 6, the instructions further comprising conducting authorization for the web browser application of the client device to access the live video from the selected one or more cameras based on validation of authentication tokens received from the web browser of the client device and from the selected one or more cameras.

9. The non-transitory computer readable medium of claim 6, the instructions further comprising, for a number of the one or more cameras selected by the client device through the web browser application exceeding a threshold, executing a load balancing process comprising:
   establishing a third secure hypertext transfer protocol (HTTPS) connection between another media server and a subset of the one or more cameras selected by a client device through the web browser application;
   establishing another websocket secure (WSS) connection between the media server and the web browser application of the client device;
   receiving, at the another media server, second media chunks of second live video from the subset of the one or more cameras through the third HTTPS connection; and
   transmitting, from the another media server, the second media chunks of the second live video to the web browser application of the client device through the another WSS connection.

10. The non-transitory computer readable medium of claim 6, further comprising:
   receiving the selection of the one or more cameras from the client device through the web browser application; and
   instructing edge devices to activate the live video for the selected one or more cameras.

11. An apparatus, comprising:
a processor, configured to:
   for performing live streaming:
      establish a first secure hypertext transfer protocol (HTTPS) connection between a media server and one or more cameras selected by a client device through a web browser application;
      establish a websocket secure (WSS) connection between the media server and the web browser application of the client device;
      receive, at the media server, media chunks of live video from the selected one or more cameras through the first HTTPS connection; and
      transmit, from the media server, the media chunks of live video received from the selected one or more cameras to the web browser application of the client device through the WSS connection; and
   for performing video on demand of a video stored on the media server:
      establishing a second HTTPS connection between the web browser application of the client device and the media server; and
      transmitting the video to the web browser application of the client device through the second HTTPS connection.

* * * * *